United States Patent
Nishino

(10) Patent No.: US 12,368,945 B2
(45) Date of Patent: Jul. 22, 2025

(54) IMAGE PICKUP APPARATUS, CONTROL APPARATUS, CONTROL METHOD, AND STORAGE MEDIUM

(71) Applicant: CANON KABUSHIKI KAISHA, Tokyo (JP)

(72) Inventor: Tatsuo Nishino, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 267 days.

(21) Appl. No.: 18/181,127

(22) Filed: Mar. 9, 2023

(65) Prior Publication Data
US 2023/0308740 A1  Sep. 28, 2023

(30) Foreign Application Priority Data
Mar. 22, 2022 (JP) ................. 2022-044941

(51) Int. Cl.
*H04N 23/61* (2023.01)
*G06T 7/20* (2017.01)
*G06V 10/70* (2022.01)
*H04N 23/67* (2023.01)

(52) U.S. Cl.
CPC .............. *H04N 23/61* (2023.01); *G06T 7/20* (2013.01); *H04N 23/67* (2023.01); *G06V 10/70* (2022.01)

(58) Field of Classification Search
CPC ........ H04N 23/61; H04N 23/67; H04N 23/64; H04N 23/6811; H04N 23/611; H04N 1/215; G06T 7/20; G06V 10/70; G06V 10/62
See application file for complete search history.

(56) References Cited

U.S. PATENT DOCUMENTS

| | | | |
|---|---|---|---|
| 11,488,374 B1* | 11/2022 | Sun | ........................... G06T 7/20 |
| 2016/0358634 A1* | 12/2016 | Molgaard | ............. G06V 40/168 |
| 2019/0147305 A1* | 5/2019 | Lu | ........................ G06F 18/2413 |
| | | | 382/157 |
| 2023/0007155 A1* | 1/2023 | Kubo | ................. H04N 23/6812 |

FOREIGN PATENT DOCUMENTS

| | | |
|---|---|---|
| JP | 2012039570 A | 2/2012 |
| JP | 2020052127 A | 4/2020 |

* cited by examiner

*Primary Examiner* — Lin Ye
*Assistant Examiner* — Steven Daniel Barry
(74) *Attorney, Agent, or Firm* — Canon U.S.A., Inc. IP Division

(57) ABSTRACT

An image pickup apparatus includes an image sensor configured to perform imaging, and a control unit configured to execute pre-capture imaging that causes the image sensor to repeatedly perform imaging when receiving a first imaging instruction, and to start post-capture imaging that causes the image sensor to repeatedly perform imaging, in a case where a main object to be focused is moving when receiving a second imaging instruction during execution of the pre-capture imaging. The control unit ends the post-capture imaging in a case where the main object stops moving or an elapsed time period from when the post-capture imaging is started is equal to or longer than a predetermined time period, and stores images that satisfy a predetermined condition among a plurality of images acquired by the pre-capture imaging and the post-capture imaging.

13 Claims, 4 Drawing Sheets

IMAGE PICKUP APPARATUS, CONTROL APPARATUS, CONTROL METHOD, AND STORAGE MEDIUM

BACKGROUND

Technical Field

One of the aspects of the disclosure relates to an image pickup apparatus.

Description of the Related Art

Japanese Patent Laid-Open No. (JP) 2020-52127 discloses an image pickup apparatus that performs pre-capture imaging in order to properly capture an image of an object that moves at a high speed. JP 2012-39570 discloses an image pickup apparatus that starts an imaging preparation operation and imaging by an imaging unit in response to a first release operation, and stores a plurality of images acquired by the imaging unit before and after an input of a second release operation in a case where the second release operation is performed.

However, the image pickup apparatus disclosed in JP 2020-52127 continuously acquires images until an end instruction is issued, and consumes large power. The image pickup apparatus disclosed in JP 2012-39570 stores an unnecessary image that has no main object to be focused, and needs a large memory capacity.

SUMMARY

One of the aspects of the embodiment provides an image pickup apparatus, a control apparatus, a control method, and a storage medium, each of which can properly capture an image of a moving object while suppressing power and memory capacity consumption.

An image pickup apparatus according to one aspect of the disclosure includes an image sensor configured to perform imaging, and at least one processor and a memory coupled to the at least one processor, the memory having instructions that, when executed by the processor, perform operations as a control unit. The control unit is configured to execute pre-capture imaging that causes the image sensor to repeatedly perform imaging when receiving a first imaging instruction, and to start post-capture imaging that causes the image sensor to repeatedly perform imaging, in a case where a main object to be focused is moving when receiving a second imaging instruction during execution of the pre-capture imaging. The control unit ends the post-capture imaging in a case where the main object stops moving or an elapsed time period from when the post-capture imaging is started is equal to or longer than a predetermined time period, and stores images that satisfy a predetermined condition among a plurality of images acquired by the pre-capture imaging and the post-capture imaging. A control apparatus, a control method, and a storage medium storing a program that causes a computer to execute the control method each corresponding to the above image pickup apparatus also constitute another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Figure 1:
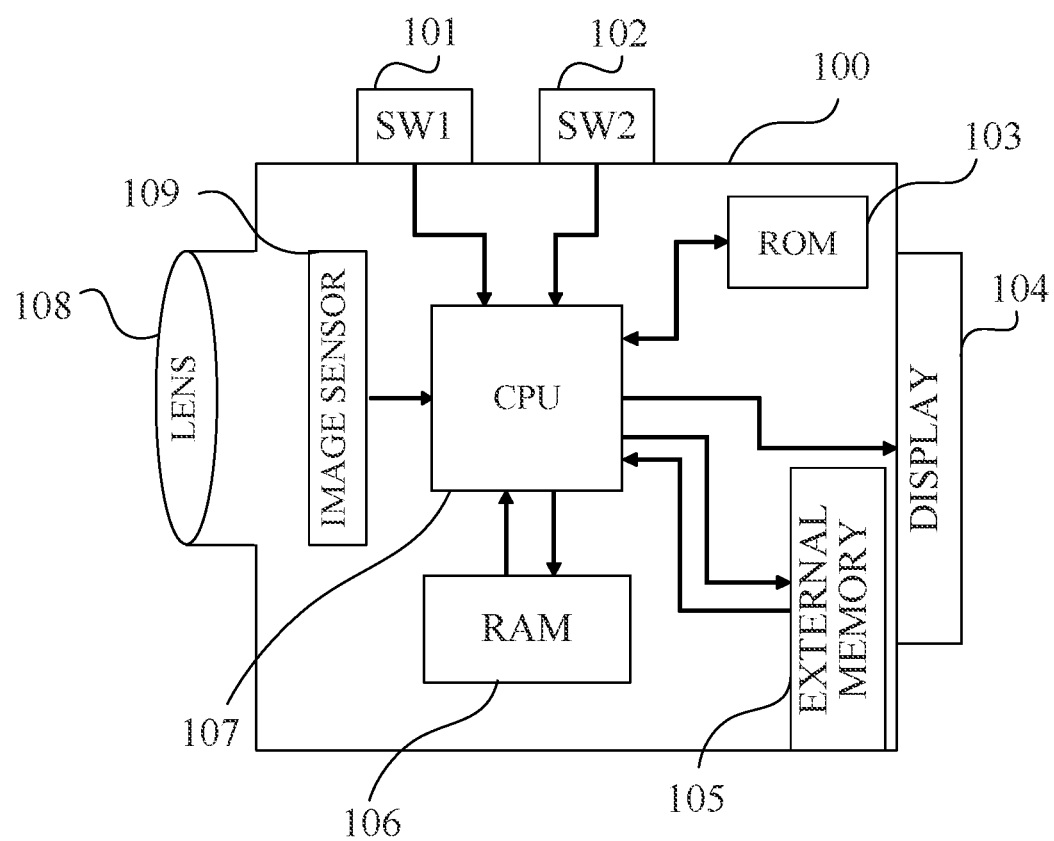
FIG. 1 is a block diagram of an image pickup apparatus according to one or more aspects of the present disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a block diagram of an image pickup apparatus 100 according to this embodiment. The image pickup apparatus 100 includes a first switch 101 (SW1), a second switch 102 (SW2), a ROM 103, a display unit 104, an external memory 105, a RAM 106, a control unit (central processing unit (CPU)) 107 (control apparatus), a lens 108, and an image sensor 109. The first switch 101 and the second switch 102 input electrical signals to the control unit 107 according to external operations. More specifically, when the first switch 101 is turned on, the control unit 107 acquires a first imaging instruction. When the second switch 102 is turned on, the control unit 107 acquires a second imaging instruction. The ROM 103 records a program necessary for starting and controlling the image pickup apparatus 100. The display unit 104 includes an LCD or the like, and displays images based on a signal output from the control unit 107. The external memory 105 stores images and the like. The RAM 106 temporarily stores images acquired by pre-capture imaging and post-capture imaging. The control unit 107 controls the entire image pickup apparatus 100. The lens 108 is an imaging optical system including a zoom unit, an aperture stop/shutter unit, a focus unit, and the like. The image sensor 109 includes a CMOS sensor, a CCD sensor, or the like, and outputs an electric signal generated by photoelectrically converting an optical image formed by the lens 108.

Figure 2:
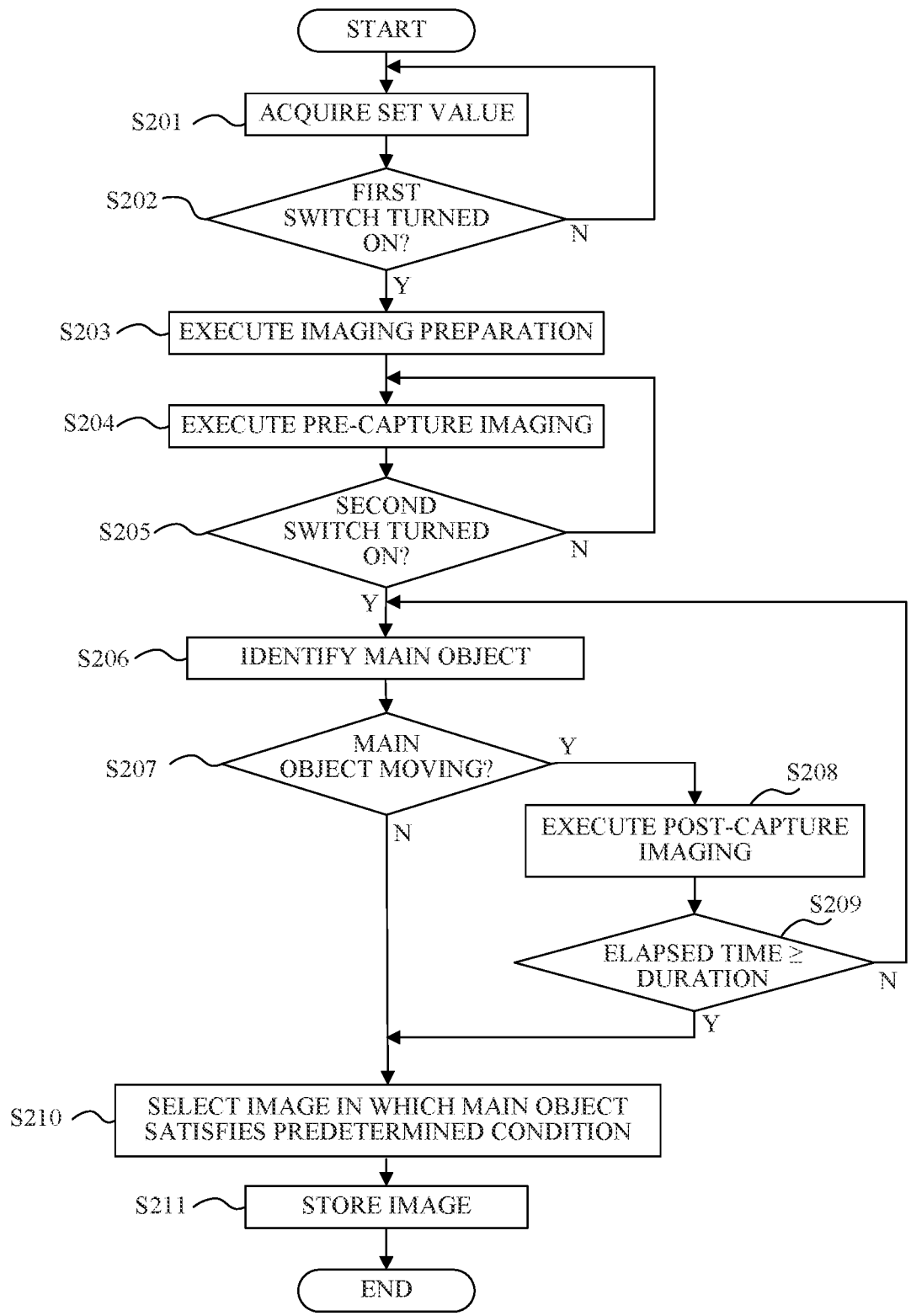
FIG. 2 is a flowchart illustrating processing by a control unit in pre-capture imaging and post-capture imaging.

FIG. 2 is a flowchart illustrating processing by the control unit 107 in the pre-capture imaging and the post-capture imaging.

In step S201, the control unit 107 acquires a set value set from the outside. The setting value includes, for example, a duration of the pre-capture imaging or the post-capture imaging, and a ratio of the area of a main object, such as a car, to the area of the entire image that is used in selecting the image to be stored.

In step S202, the control unit 107 determines whether or not the first switch 101 has been turned on (whether or not the control unit 107 has received or acquired the first imaging instruction). In a case where it is determined that the first switch 101 has been turned on, the flow proceeds to step S203; otherwise, the flow returns to step S201.

In step S203, the control unit 107 prepares for imaging based on the set values acquired in step S201. For example, the control unit 107 may acquire a background image in a case where the control unit 107 identifies the main object by comparing the background image that includes the background and does not include the main object with an image acquired by the pre-capture imaging or the post-capture imaging.

In step S204, the control unit 107 performs the pre-capture imaging that causes the image sensor 109 to repeatedly perform imaging. One or more images acquired by the pre-capture imaging are temporarily stored in the RAM 106.

In step S205, the control unit 107 determines whether or not the second switch 102 has been turned on (whether or not the control unit 107 has received or acquired the second imaging instruction) during the execution of the pre-capture imaging. In a case where it is determined that the second switch 102 has been turned on, the flow proceeds to step S206; otherwise, the flow returns to step S204.

In step S206, the control unit 107 identifies the main object included in the image acquired by the pre-capture imaging or the post-capture imaging. For example, the control unit 107 may be configured to identify the main object by learning using a plurality of images including the main object as learning data. The control unit 107 may identify the main object by comparing the background image acquired before the post-capture imaging is started with an image acquired by at least one of the pre-capture imaging and the post-capture imaging.

In step S207, the control unit 107 determines whether or not the main object is moving using the position of the main object included in each of the plurality of images acquired by at least one of the pre-capture imaging and the post-capture imaging. For example, the control unit 107 determines that the main object is moving in a case where a difference between the position of the main object included in the image acquired at the predetermined timing and the position of the main object included in the image acquired at a timing next to the predetermined timing is equal to or larger than a predetermined value. The predetermined value is, for example, a value obtained by multiplying a diagonal length of the image by a predetermined ratio. If the control unit 107 determines that the main object is moving, the flow proceeds to step S208; otherwise, the flow proceeds to step S210.

In step S208, the control unit 107 performs the post-capture imaging that causes the image sensor 109 to repeatedly perform imaging. Images obtained by post-capture imaging are temporarily stored in the RAM 106.

In step S209, the control unit 107 determines whether or not an elapsed time period from when the post-capture imaging is started is equal to or longer than the duration acquired in step S202 (equal to or longer than a predetermined time period). If the control unit 107 determines that the elapsed time period is equal to or longer than the duration, the control unit 107 ends the post-capture imaging and the flow proceeds to step S210; otherwise, the flow returns to step S206.

In step S210, the control unit 107 selects an image that satisfies a predetermined condition among the images acquired by the pre-capture imaging and the post-capture imaging stored in the RAM 106. For example, the control unit 107 may select an image in which the main object is located in an area having sides that are 1% shorter than the outer peripheral sides of the image.

In step S211, the control unit 107 stores the image selected at step S210 in the external memory 105. The image may be stored in an external recording apparatus via a LAN, WiFi, or the like (not illustrated).

As described above, in a case where the main object to be focused is moving at a high speed, the configuration according to this embodiment can capture an image including the main object within a predetermined time period by the pre-capture imaging and the post-capture imaging. Among the acquired images, an image in which the main object satisfies a predetermined condition is stored in the memory. Thus, an image of a moving main object can be properly captured while power and memory capacity consumption is suppressed.

First Embodiment

Figure 3:
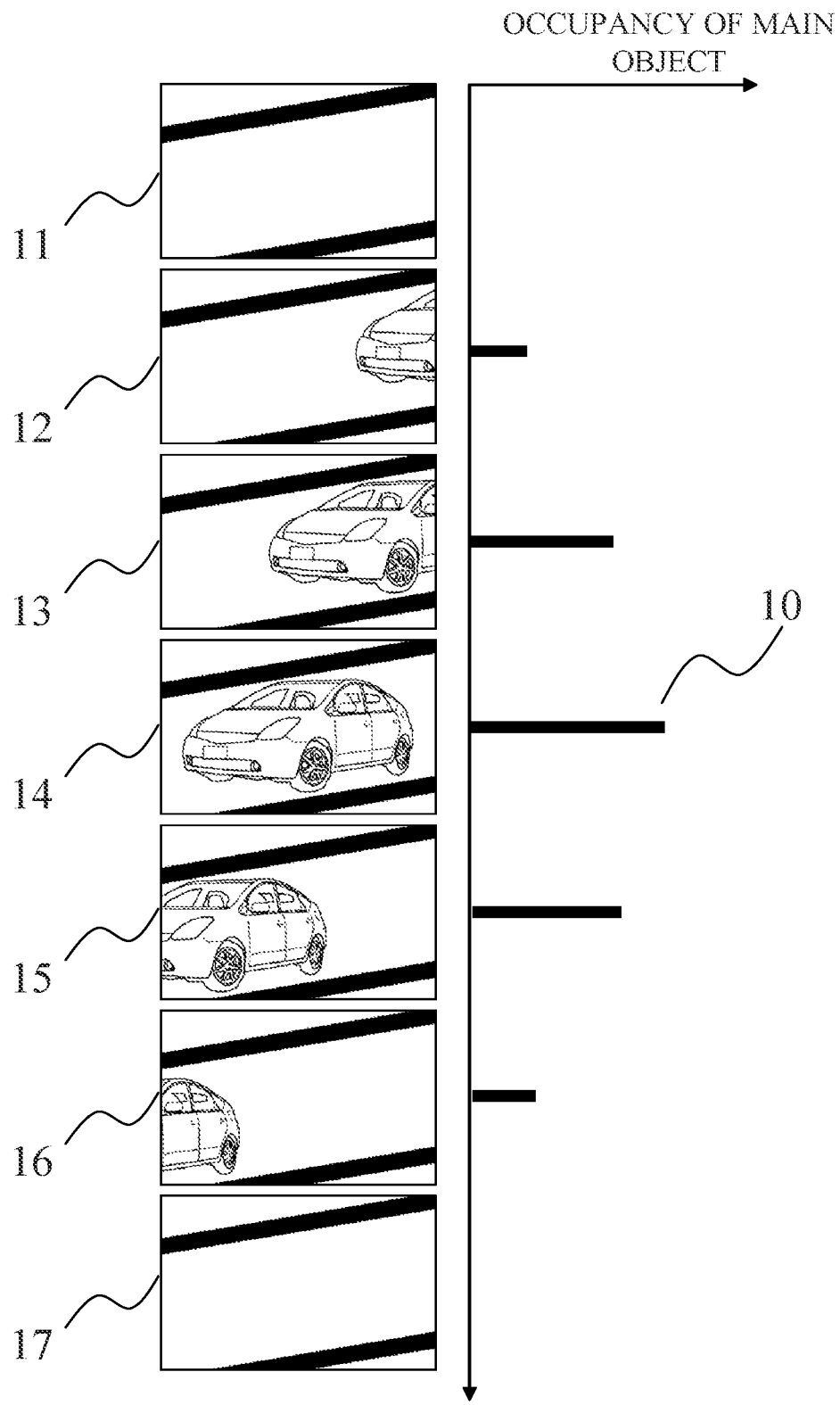
FIG. 3 illustrates images acquired by the pre-capture imaging and the post-capture imaging in a first embodiment.

Referring now to FIG. 3, a description will be given of processing in the pre-capture imaging and the post-capture imaging according to this embodiment. FIG. 3 illustrates images acquired by the pre-capture imaging and the post-capture imaging according to this embodiment. After the pre-capture imaging is started, images 11 and 12 are sequentially acquired and stored in the RAM 106. Image 13 is acquired at a timing when the second switch 102 is pressed. The image 11 is a background image that includes the background and does not include the main object. The images 12 and 13 include the background and the main object, such as a car in this embodiment. The control unit 107 identifies the main object included in the image 13 by comparing the images 11 and 13. The control unit 107 compares the images 12 and 13 to determine whether the main object is moving. In FIG. 3, since the main object is moving, the post-capture imaging is started. The post-capture imaging sequentially acquires images 14, 15, 16, and 17 until the main object stops moving or the elapsed time period from when the post-capture imaging is started is equal to or longer than the duration, and stores the images in the RAM 106. The control unit 107 selects images that satisfy a predetermined condition among the images 11 to 17 stored in the RAM 106 and stores them in the external memory 105. In this embodiment, the control unit 107 selects the images in which a ratio of the area of the main object to the area of the entire image illustrated in graph 10 in FIG. 3 (occupancy of the main object in the image) is equal to or larger than a predetermined value, such as 25%.

Second Embodiment

Figure 4:
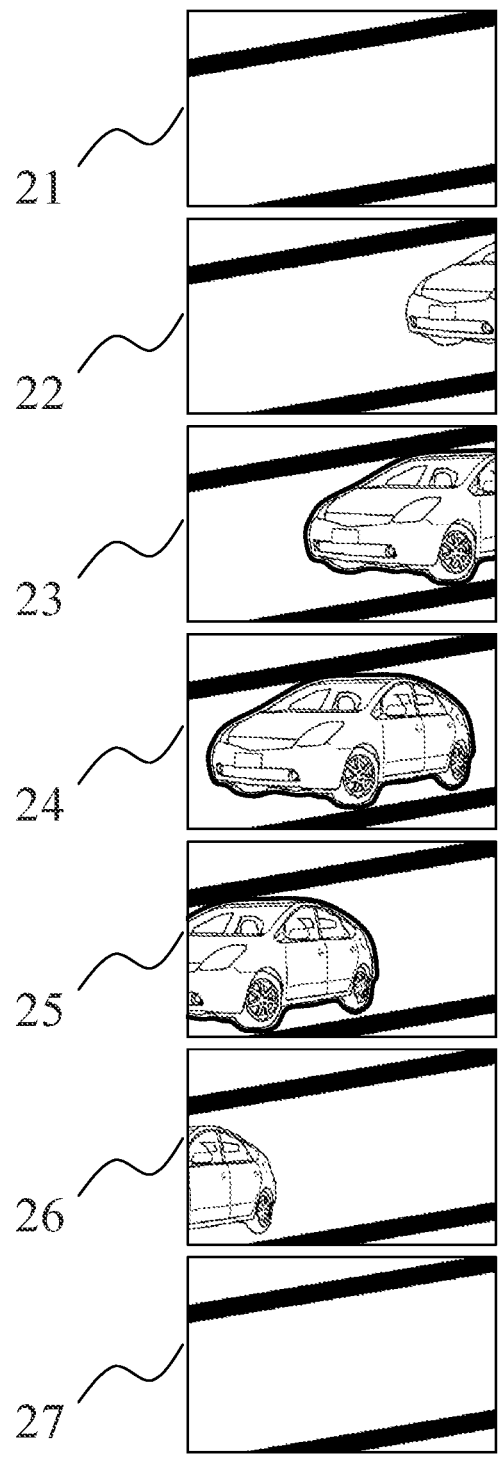
FIG. 4 illustrates images acquired by the pre-capture imaging and the post-capture imaging in a second embodiment.

Referring now to FIG. 4, a description will be given of processing in the pre-capture imaging and the post-capture imaging according to this embodiment. FIG. 4 illustrates images acquired in the pre-capture imaging and the post-capture imaging according to this embodiment. After the pre-capture imaging is started, images 21 and 22 are sequentially acquired and stored in the RAM 106. Image 23 is acquired at a timing when the second switch 102 is pressed. The image 21 is a background image that includes the background and does not include the main object. The images 22 and 23 include the background and the main object, such as a car in this embodiment. The control unit 107 identifies the main object included in the image 23 by comparing the images 21 and 23. The control unit 107 compares the images 22 and 23 to determine whether the main object is moving. In FIG. 4, since the main object is moving, the post-capture imaging is started. The post-capture imaging sequentially acquires images 24, 25, 26, and 27 until the main object stops moving or the elapsed time period from when the post-capture imaging is started is equal to or longer than the duration, and stores the images in the RAM 106. The control unit 107 selects images that satisfy a predetermined condition among the images 21 to 27 stored in the RAM 106 and stores them in the external memory 105. In this embodiment, the control unit 107 encloses the main object included in the image by lines as illustrated in FIG. 4, and selects an image (image 24 in this embodiment) in which the lines does not contact the outline of the image or an image that accommodates the entire main object.

Each embodiment provides an image pickup apparatus, a control apparatus, a control method, and a storage medium, each of which can properly capture an image of a moving object while suppressing power and memory capacity consumption.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

The control apparatus in this disclosure may be separate from the image pickup apparatus. For example, the control apparatus may be an external apparatus connected to the image pickup apparatus by wire or wirelessly.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-044941, filed on Mar. 22, 2022, which is hereby incorporated by reference herein in its entirety.

What is claimed is:

1. An image pickup apparatus comprising:
an image sensor configured to perform imaging; and
at least one processor and a memory coupled to the at least one processor, the memory having instructions that, when executed by the processor, perform operations as a control unit configured to execute pre-capture imaging that causes the image sensor to repeatedly perform imaging when receiving a first imaging instruction, and to start post-capture imaging that causes the image sensor to repeatedly perform imaging, in a case where a main object to be focused is moving when receiving a second imaging instruction during execution of the pre-capture imaging,
wherein the control unit ends the post-capture imaging in a case where the main object stops moving and stores images that satisfy a predetermined condition among a plurality of images acquired by the pre-capture imaging and the post-capture imaging.

2. The image pickup apparatus according to claim 1, wherein the predetermined condition is that a ratio of an area of the main object to an area of an entire image is equal to or larger than a predetermined value.

3. The image pickup apparatus according to claim 1, wherein the predetermined condition is that an entire main object is accommodated in the image.

4. The image pickup apparatus according to claim 1, wherein the control unit determines whether or not the main object is moving using a position of the main object included in each of a plurality of images acquired by at least one of the pre-capture imaging and the post-capture imaging.

5. The image pickup apparatus according to claim 1, wherein the control unit identifies the main object using a background image acquired before the post-capture imaging is started and an image acquired by at least one of the pre-capture imaging and the post-capture imaging.

6. The image pickup apparatus according to claim 1, wherein the control unit is configured to identify the main object by learning using a plurality of images including the main object as learning data.

7. The image pickup apparatus according to claim 1, wherein the control unit ends the post-capture imaging in a case where an elapsed time period from when the post-capture imaging is started is equal to or longer than a predetermined time period.

8. A control apparatus comprising at least one processor and a memory coupled to the at least one processor, the memory having instructions that, when executed by the processor, perform operations as a control unit configured to execute pre-capture imaging that causes an image sensor to repeatedly perform imaging when receiving a first imaging instruction, and to start post-capture imaging that causes the image sensor to repeatedly perform imaging, in a case where a main object to be focused is moving when receiving a second imaging instruction during execution of the pre-capture imaging, wherein the control unit ends the post-capture imaging in a case where the main object stops moving and stores images that satisfy a predetermined condition among a plurality of images acquired by the pre-capture imaging and the post-capture imaging.

9. The control apparatus according to claim 8, wherein the control unit ends the post-capture imaging in a case where an elapsed time period from when the post-capture imaging is started is equal to or longer than a predetermined time period.

10. A control method comprising the steps of:
   execute pre-capture imaging that causes an image sensor to repeatedly perform imaging when receiving a first imaging instruction;
   starting post-capture imaging that causes the image sensor to repeatedly perform imaging, in a case where a main object to be focused is moving when receiving a second imaging instruction during execution of the pre-capture imaging,
   ending the post-capture imaging in a case where the main object stops moving; and
   storing images that satisfy a predetermined condition among a plurality of images acquired by the pre-capture imaging and the post-capture imaging.

11. The control method according to claim 10, wherein the post-capture imaging is ended in a case where an elapsed time period from when the post-capture imaging is started is equal to or longer than a predetermined time period.

12. A non-transitory computer-readable storage medium storing a program that causes a computer to execute a control method, the method comprising the steps of:
   execute pre-capture imaging that causes an image sensor to repeatedly perform imaging when receiving a first imaging instruction;
   starting post-capture imaging that causes the image sensor to repeatedly perform imaging, in a case where a main object to be focused is moving when receiving a second imaging instruction during execution of the pre-capture imaging,
   ending the post-capture imaging in a case where the main object stops moving; and
   storing images that satisfy a predetermined condition among a plurality of images acquired by the pre-capture imaging and the post-capture imaging.

13. The non-transitory computer-readable storage medium according to claim 12, wherein the post-capture imaging is ended in a case where an elapsed time period from when the post-capture imaging is started is equal to or longer than a predetermined time period.

* * * * *